Ernst Meier
INVENTOR

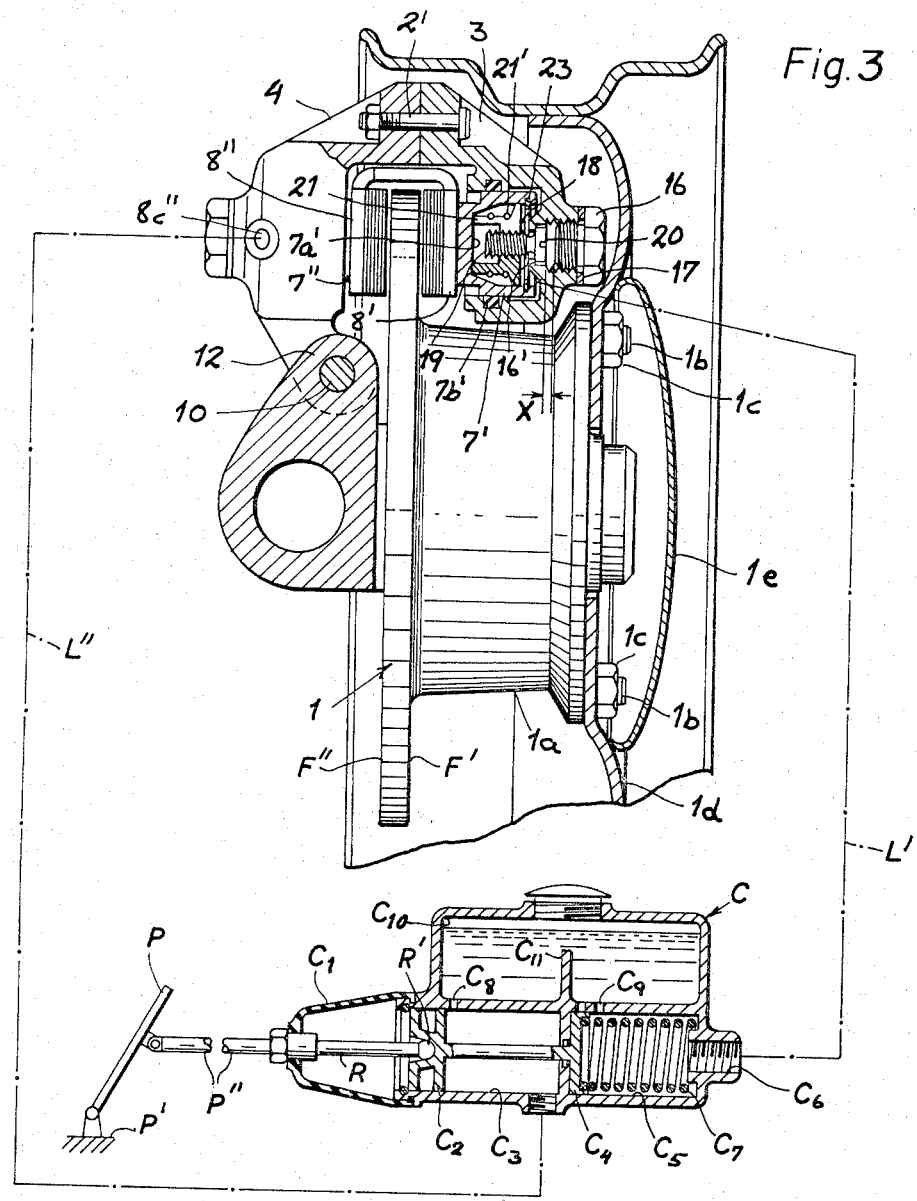
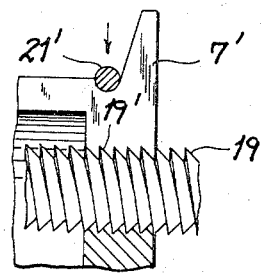

Aug. 22, 1967   E. MEIER   3,337,009
BRAKE SYSTEM WITH TWIN FLUID-SUPPLY NETWORKS
Filed March 5, 1965   7 Sheets-Sheet 4
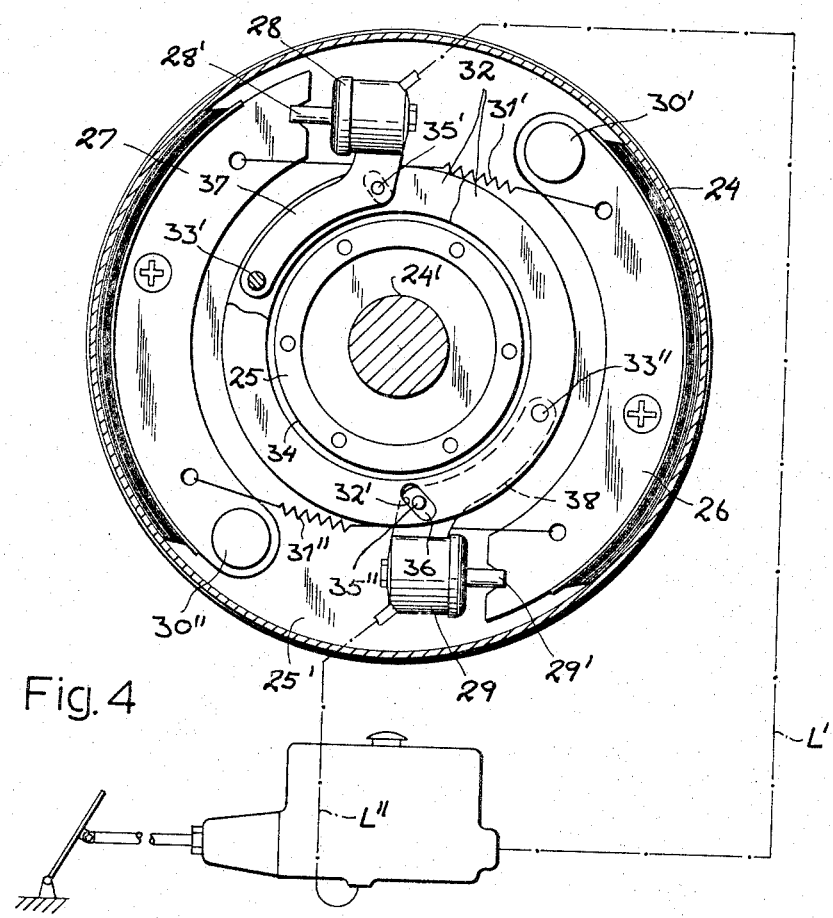
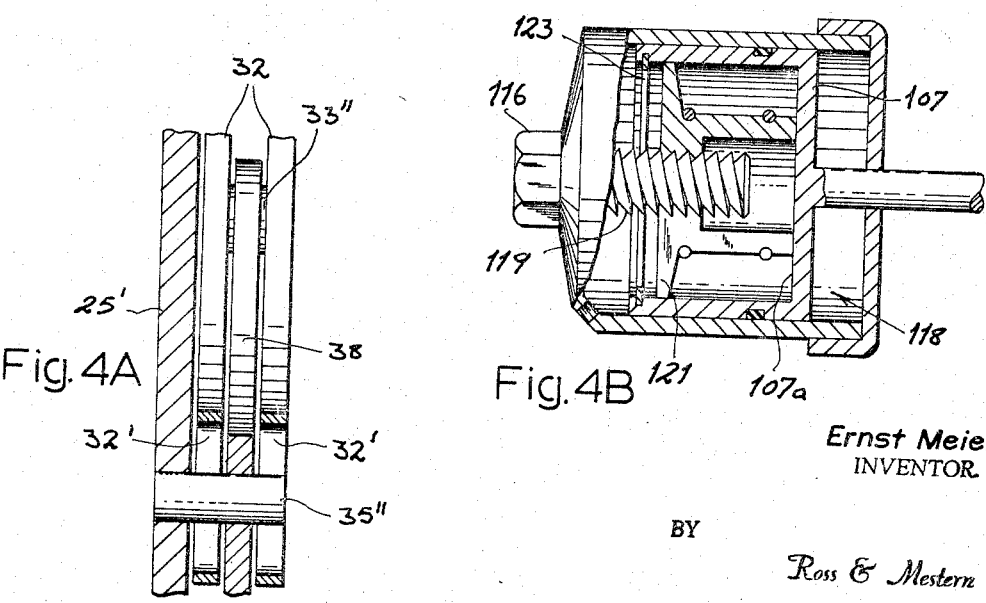
Ernst Meier
INVENTOR.
BY
Ross & Mestern Inventor:
Ernst Meier Aug. 22, 1967   E. MEIER   3,337,009
BRAKE SYSTEM WITH TWIN FLUID-SUPPLY NETWORKS
Filed March 5, 1965   7 Sheets-Sheet 6

Inventor:
Ernst Meier

BY Ross & Mestern

Aug. 22, 1967   E. MEIER   3,337,009
BRAKE SYSTEM WITH TWIN FLUID-SUPPLY NETWORKS
Filed March 5, 1965
7 Sheets-Sheet 7

Ernst Meier
INVENTOR.

BY    Ross & Mestern

United States Patent Office 3,337,009
Patented Aug. 22, 1967

3,337,009
BRAKE SYSTEM WITH TWIN FLUID-SUPPLY NETWORKS
Ernst Meier, Frankfurt am Main, Germany, assignor to Alfred Teves, Maschinen- und Armaturenfabrik KG, Frankfurt am Main, Germany, a firm of Germany
Filed Mar. 5, 1965, Ser. No. 437,434
Claims priority, application Germany, Apr. 23, 1964, T 26,062
3 Claims. (Cl. 188—152)

My present invention relates to brake systems for automotive vehicles and the like, and more particularly, to an improved dual-brake arrangement wherein the braking devices of the vehicle are subdivided into at least a pair of networks having separate fluid supply lines for the delivery of a pressure medium to the actuable units of the brake.

It has been proposed hitherto to subdivide the foundation brakes of an automotive vehicle into a plurality of networks, generally two, each of which is provided with a respective master cylinder and fluid lines communicating between such cylnider and wheel cylinders associated therewith. Thus, in some conventional arrangements, the front-wheel brakes are operable by one master cylinder whereas the rear-wheel brakes are powered via the other, while in another arrangement the left rear-wheel brake and the right front-wheel brake are coupled for joint actuation while the other diagonally positioned wheel brakes are similarly coupled to a respective master cylinder. These arrangements have the advantage that, upon failure of the fluid-supply networks associated with one of the pairs of jointly operable wheel brakes, the other pair of brakes remains operative and vice versa. The overall safety factor of the braking system is increased since the possibility that a failure will occur in both fluid networks simultaneously is only a small fraction of the probability that a failure may occur in any one of these networks.

Such brake systems, however, are accompanied by a disadvantage, namely the fact that failure of one fluid supply network will reduce the available braking surface area to half that usually employed with a resulting increase in the time required to bring the vehicle to a halt.

It is the principal object of the present invention, therefore, to provide a dual brake of fluid supply networks connected with the wheel cylinders, wherein this disadvantage can be obviated.

It is a more specific object of the present nivention to provide an improved and brake system of the general character described which permits the effective braking surface area to be maintained even in the event of failure of one of the fluid supply networks.

These objects and others which will become apparent hereinafter can be attained in accordance with the present invention in a brake system which comprises at least one and preferably a plurality of foundation brake means each of which includes an annular braking surface and at least two brake shoes juxtaposed therewith and displaceable toward and away from this surface for engagement therewith to brake relative rotation of the surface and the shoes, each of the shoes being associated with and operatively connected to a respective fluid-powered means (e. g. piston-and-cylinder means) for displacing the shoes relatively to the braking surface and in a direction generally transversely thereto. In accordance with a significant aspect of this invention, each of these fluid-powered means of a common foundation brake means and associated with a respective brake surface is connected via an individual fluid-transmission line, preferably constituting part of a respective fluid supply network energized by a respective master cylinder; the braking faces of the said surface and the brake shoes juxtaposed therewith are shiftable in the direction of displacement of the brake shoes upon the failure of one of these fluid supply networks and the immobilization of the respective power means to enable the fluid-responsive means remaining effective to bring the corresponding brake shoe into engagement with the annular surface and thereafter bring this surface into contact with the other brake shoe.

While, in general, it will be desirable to mount the brake shoes upon a relatively stationary support member with respect to the axis of rotation of the member carrying the annular surface, it will be understood that a kinematic reversal of the movable and immovable members is also possible, in that the brake shoes can be mounted upon a rotatable member while the annular surface remains relatively stationary. The annular surface according to the invention, can be constituted as the disk of a disk brake in which case the brake shoes are displaceable generally in a direction parallel to the axis of rotation of the disk and perpendicularly to its face which extends transversely of the axis of rotation. The surface may, however, also be constituted as the drum of an internal-expanding brake whose brake shoes are mounted upon a plate perpendicular to the axis of rotation of the drum which, in turn, can be carried by the axle. In this case, the generally cylindrical face of the drum has generatrices extending parallel to the axis of rotation of the drum and the brake shoes are shiftable radially outwardly into engagement with this cylindrical face. As noted above, it is an important characteristic of the present invention that the nonactuatable brake shoe and the disk- or drum-type brake surface have faces which are relatively displacable generally transversely to themselves in a manner adapted to bring them into engagement with one another upon actuation of the effective fluid-responsive means. Thus, according to the invention, the brake disk can be shifted transversely to itself, i.e. in axial direction, while the brake drum can be relatively radially shiftable. Alternatively, the fluid-responsive devices can be provided with means coupling them together so that the reaction movement of an operative and actuable fluid-responsive element, can be transformed into a displacement of the nonactuatable element to shift its brake shoe in the direction of the braking face.

When the fluid-responsive means is, as will be generally the case, a piston-and-cylinder device, the telescopingly engaged piston-and-cylinder members can be relatively shiftable upon the introduction of hydraulic fluid into the device for displacing the respective brake shoes axially with regard to the cylinder members. For both drum- and disk-type brakes, the brake shoe will be shiftable in the direction of the axis of the piston and cylinder members. One of the members of each device can bear upon the respective brake shoe while the other takes up the reaction force and is coupled with the corresponding member of the fluid-responsive device of the other brake shoe. Thus the reaction-displaceable member of each fluid-responsive device can be provided with a respective lever, the levers being interconnected by any suitable linkage for joint operation of both brake shoes upon failure of one of the power means. Similarly, the reaction-displaceable members can be mounted on a common yoke or support whereby force is transmitted from the actuable power means to the nonactuatable one.

According to another feature of the present invention, adjusting means can be provided for the unidirectional shifting of the faces of the braking surface and the brake shoes toward one another upon failure of one of the power arrangements to take up the excessive play produced when one of the power means is no longer operative. It will be understood that, in accordance with the present invention, the failure of one of the piston- and piston-cylindrical arrangements results in an increase of the stroke of the piston remaining operative to effect first a displacement of its respective brake shoe into engagement with the braking surface and thereafter the engagement of the nonactuatable brake shoe therewith. The adjusting means of the present invention permits the additional play to be compensated for and affords restoration of the desirable stroke so that after an initial operation of the brake with a relatively long brake stroke, successive actuations require only the usual stroke. The adjusting means of the present invention can include pawl-and-ratchet means between the piston-and-cylinder means of each fluid-responsive means or friction-locking means between the member bearing the movable face and a relatively nonshiftable part for resetting the assembly in a position wherein the play is taken up.

The above and other objects, features and advantages of the present invention will become more readily apparent from the following description, reference being made to the accompanying drawing in which:

FIG. 3 is a vertical cross-sectional view, partly an elevation, of such brake;

FIG. 3A is an enlarged detail view of the adjusting means for compensating for the play of the brake;

FIG. 4 is a vertical cross-sectional view taken transversely to the axis of rotation of a vehicle wheel showing a drum-type brake according to the invention;

FIG. 4A is a detail view of the mounting for this brake;

FIG. 4B is an elongated detailed view of the adjusting means thereof;

Figure 1:
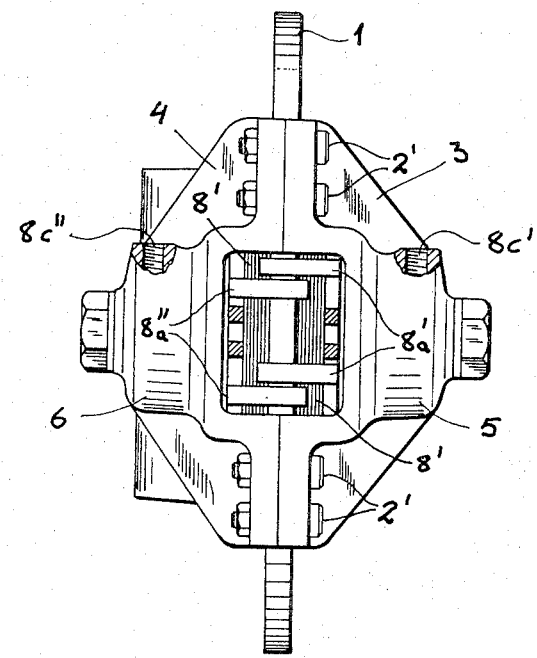
FIG. 1 is a plan view of a disk brake embodying the present invention.

In FIGS. 1–3 and 3A, I show a segmental disk brake according to the invention wherein a yoke 2 extends around the edge of a brake disk 1 carried by a shaft 1' and forming braking faces F', F'', extending transversely to the axis of the shaft 1'. The bipartite yoke 2 thus extends on opposite sides of the brake 1 and is held together by bolts 2'; the yoke carries a pair of fluid-operated means, i.e. piston-and-cylinder arrangements, respectively designed to urge a pair of brake shoes 8', 8'' toward the faces F' and F'' of the disk 1. The disk 1 is joined to or integral with a hub 1a whose bolts 1b are provided with the usual nuts 1c retaining a wheel 1d on the hub. The shaft 1' can thus constitute the axle of a motor vehicle while a hubcap 1e can be removably mounted on the wheel 1d to conceal the bolts 1b and the nuts 1c. The wheel 1d, disk 1 and hub 1a are all rotatable with respect to the usual axle housing 9, formed with a hinge eye 12 through which a pintle 10 extends pivotally mounting the yoke 2 to the axle housing via the hinge eyes 13. The arms 3 and 4 of the yoke (FIGS. 1 and 3) are respectively provided with cylinders 5 and 6 whose pistons 7' and 7'' respectively bear upon the brake shoes 8' and 8''. The latter are provided with inwardly extending guide arms 8a' and 8a'' which are interleaved and prevent shifting of the brake shoes within the yoke.

The yoke has only limited freedom of swinging movement about the pintle 10 (FIG. 3) since the latter carries a friction disk 14 (e.g. a Belleville washer) which is clamped against the yoke 2 via a nut 11 while a shoulder 10' of the pintle 10 bears against the eye 12. Depending upon the compression applied by nut 11 to the washer 14, a greater or lesser force must be applied to the yoke 2 to displace it from its normal position indicated in FIG. 3.

Each cylinder 5, 6 is provided with a threaded abutment 16 which forms a stop for the respective piston 7', 7'', as will be more fully described hereinafter, the stops 16 being threaded into the cylinder housings and sealed thereagainst via brakings 17 whose thickness can be varied by tightening the abutments 16 or by replacement to permit the "play" X of the brake to be varied. The abutment 16 serves as a stop for a screw 19 whose saw-tooth threads 19' are shown in FIG. 3A in greater detail. The head 20 of the screw 19 thus is shiftable with lost motion within the respective cylinder housing between the abutment 16 and a flange 16' of the housing. Screw 19 is part of an automatic adjusting means for compensating for wear of the brake shoes and for resetting the brake play upon failure of one of the fluid-supply lines, as will be apparent hereinafter.

This adjusting or compensating means further comprises a split nut 21 which is held inwardly by a pair of annular springs 21' and bears against the base 7a' of the hollow piston 7'. A seal 7b' is disposed between each piston and a respective cylinder to form a fluid compartment behind the piston to which the fittings 8c', 8c'' can conduct the hydraulic fluid. A split ring 23 is received in the wall of each piston for co-operation with the nut 21 as will be described in greater detail hereinafter.

Hydraulic fluid is supplied to the cylinders 8' and 8'', respectively, via the fluid-transmission lines L' and L'' from a tandem-cylinder arrangement represented somewhat diagrammatically. For the purposes of the present invention, however, it will be understood that each of the lines L', L'' represents a respective fluid-transmission network extending to the corresponding cylinders of all of the wheel brakes and is provided with a respective master cylinder. The master cylinders may be united in a common housing and provided with tandem-connected pistons or in separate housings for joint actuation by a brake pedal.

The master-cylinder arrangement illustrated in FIG. 3, by way of example, includes a brake pedal P pivotally connected to the chassis at P' and coupled via a linkage P'' with the actuating rod R of the master cylinder means generally designated C. The rod R is surrounded by a flexible boot $C_1$ and has a spheroidal extremity R' seated within a piston $C_2$ of a master cylinder bore $C_3$ from which the line L' is supplied with hydraulic fluid. Another piston $C_4$ is shiftable within a bore $C_5$ whose outlet $C_6$ communicates with the line L''. Thus, upon depression of the pedal P, the pistons $C_2$ and $C_4$ are displaced to the right against the force of a restoring spring $C_7$ until they block the respective apertures $C_8$ and $C_9$ connecting the bores $C_3$ and $C_5$ with the fluid-storage reservoir $C_{10}$. The hydraulic fluid within the bores $C_3$ and $C_5$ is then forced through the lines L' and L'' to the respective wheel-brake cylinders 5 and 6 of each of the wheel-brake means of the vehicle. A partition $C_{11}$ can be provided within the reservoir $C_{10}$ to prevent draining thereof upon failure of the seals or transmission line of one network. It will be apparent that if either of lines L' and L'' rupture, depression of the pedal P will supply hydraulic fluid to the corresponding wheel-brake cylinders.

During normal brake operation, the pedal P is depressed and hydraulic fluid is supplied to both cylinders 5 and 6 so that the respective pistons 7' and 7'' are urged in the direction of the disk 1 until their brake shoes 8', 8'' engage the disk. Upon wear of either brake shoe, the displacement of the respective piston 7' or 7'' exceeds the previous displacement thereof so that the split ring 23 thereof, during this further movement, entrains the split nut 21 in the direction of the disk 1 and stops it axially with respect to the screw 19 which is retained by the flange 16' by one or more teeth in the manner of a pawl-and-ratchet assembly. Since the teeth are shaped to permit displacement of the nut 21 in the direction of the disk 1 (i.e. to the left in faces 3 and 3a) but to retard it when it is urged to the right, reverse displacement of the brake shoes as a result of contact with the rotating disk or via springs (not shown) is impeded by engagement of the heads 20 of the screws 19 with the respective stop 16. The brake play X is thus re-established even with wear of the brake shoe. The actuation of the brake shoes, being substantially concurrent, does not result in any displacement of the yoke 2.

Upon failure of one of the networks L', L" or of the respective master cylinder, one of the wheel-brake cylinders 5, 6 is rendered inoperative. Assuming that line L" fails and cylinder 6 is unactuated, it will be apparent that initial depression of the pedal P will drive fluid through the line L' and displace the piston 7' until its shoe 8' engages the disk 1. Continued application of fluid pressure will permit the reaction force on cylinder 5 to exceed the predetermined resistance of yoke 2 to swinging movement about the pintle 10 and rotate it slightly (FIG. 3) until the brake shoe 8" engages the disk 1 while its piston 7" is in its extreme left-hand position. Since the piston 7" must then be shifted through a distance of substantially 2X or twice the usual play, the split ring 23 will engage the nut 21 and draw it to the left relative to the saw-tooth screw 19 and further step these adjusting means 18 to restore the original play X. A subsequent actuation of the system will require movement of the piston only through this reduced distance so that its stroke will remain the same even though it serves to bring both brake shoes into engagement with the rotatable surface. The release of the brake takes place in the usual manner by outward force resulting from engagement of the brake shoes with the disk or via springs tending to urge the brake shoes apart. The yoke 2 will remain in its canted position about the pintle 10 until repair of the brake line permits both shoes again to be operative and until manual readjustment of the pawl-and-ratchet device is effected by removal of the abutment 16 and the rotating of head 20 to draw the nut 21 to the right along the screw. Failure of the line L' will render the cylinder 5 inoperative although the piston 7" will now actuate both brake shoes in a manner identical with that described, with the yoke 2 being swung about the pintle 10 in the opposite sense (FIG. 3). While the adjusting means 18 for each of the brake cylinders of the embodiments of FIGS. 1–3, wherein the yoke is shiftable relatively to the brake disk, is a pawl-and-ratchet arrangement in which adjustment is effected in steps, it will be understood that it is also possible to make use of continuous adjusting means wherein a unidirectional frictional engagement of a member corresponding to the nut 21 can be locked to a member corresponding to the screw 19. Such an adjusting and wear-compensating arrangement is shown, described and claimed in commonly assigned copending application Ser. No. 337,684, now Patent No. 3,232,387, filed January 13, 1964, by myself, Hans Schanz and Juan Belart.

As noted earlier, the yoke can be held stationary, i.e. fixed to the axle housing while the brake disk is shiftable. In FIG. 3B, I show a brake disk 101 whose hub 101a can carry the wheel as previously indicated and which can co-operate with a disk brake identical with that of FIGS. 1–3 except that the yoke 2 thereof is not shiftable about the pintle 10 but is, in effect rigid with the axle housing 9. In this case, the disk 101 can be axially shiftable upon the shaft 101' which is blind at 101a' to rotatably engage a sleeve portion 101b of the disk 101. The disk can thus be shifted in axial direction to the left or to the right, depending upon which of the cylinders is operable.

The pawl-and-ratchet arrangement in this case as well resets the play X. A split ring 101c within the sleeve 101b can provide a resistance to the axial displacement of the disk relative to the axial and corresponds in function to the Belleville washer 17 previously mentioned.

In FIG. 4, there is shown a duplex internal-expanding brake which comprises a brake drum 24 which, in the conventional manner, is mounted upon the axle 24' which also carries the hub 24" of the wheel. The support plate 25' for the brake shoes is bolted onto the axle housing 25 in the usual manner and is surrounded by the drum 24 whose interior forms the annular braking surface with which a pair of segmental brake shoes 26 and 27 are engageable. These brake shoes are pivotally mounted at 30', 30" to the support disk or shield 25' and are provided with the usual brake linings while springs 31', 32' tend to draw the brake shoes together and thus to withdraw them from engagement with the drum. Each of the brake shoes is operable by a piston-and-cylinder arrangement containing an adjusting means as illustrated in FIG. 4b and is coupled with a respective master cylinder via the lines L' and L" as previously described. The pistons of the fluid-responsive means have rods 28', 29' bearing against the extremities of the brake shoes 27 and 26 remote from their pivots 30' and 30", the cylinders 28 and 29 being rigid with respective levers 37 and 38 fulcrumed at 35', 35" to the support disk 25'. These levers 37, 38 are interconnected by any linkage tending to displace them jointly to effect braking even when only one of the cylinders is actuated. While such linkage can be a lever arrangement or the like, it is here shown as a pair of axially spaced rings 32, axially forwardly of the axle housing 25 and thus clearing the latter so as to permit shifting of the ring transversely to the axis. These rings are pivotally secured to the levers 37 and 38 by pins 33', 33" while being provided with slots 32' adapted to permit generally transverse movement of the rings. Thus, rotation of the lever 37 about its fulcrum 35' will draw the rings 32 upwardly to the left (FIG. 4) and effect counterclockwise rotation of the lever 38 whereas a clockwise rotation thereof will draw the rings 32 downwardly to the right and cause the lever 37 to swing in a counterclockwise sense.

Figure 2:
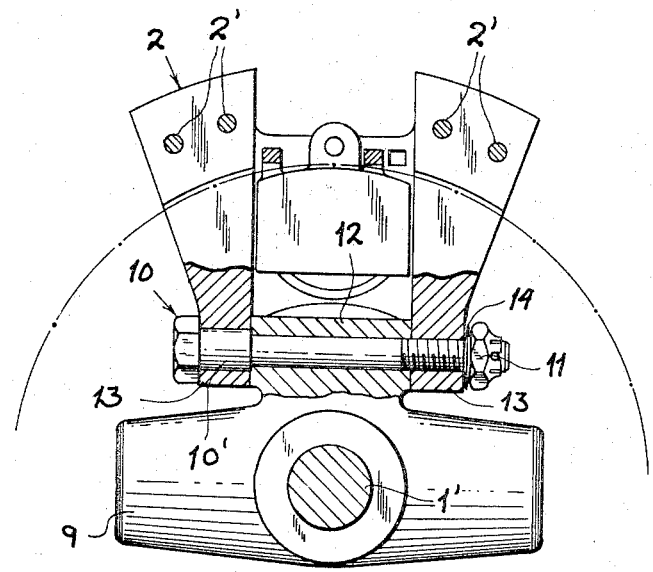
FIG. 2 is a fragmentary cross-sectional view, partly in side elevation, showing a detail view of the yoke-support structure of the brake of FIG. 1.
Figure 3B:
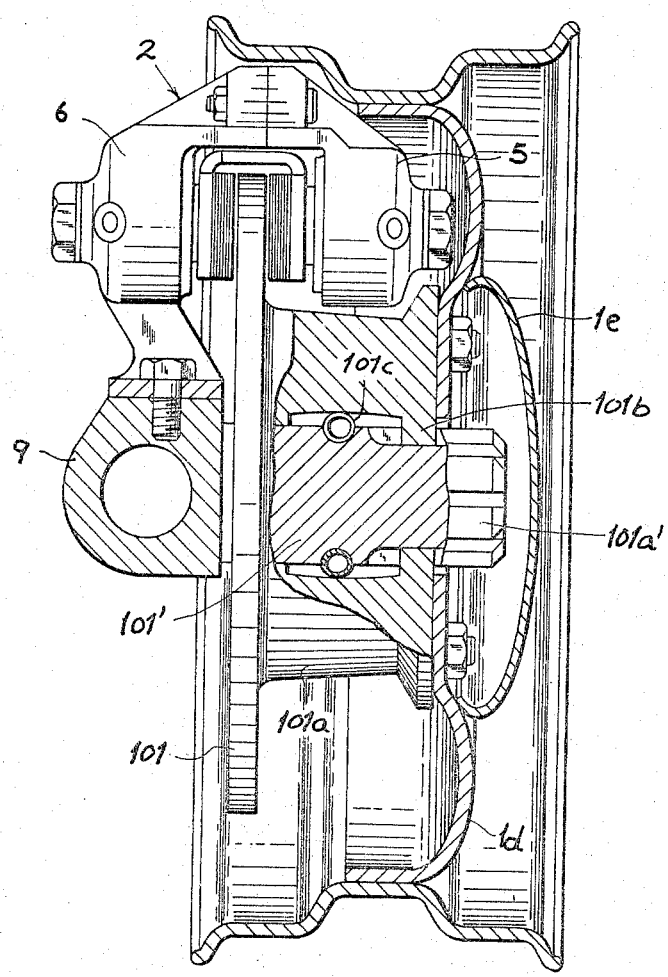
FIG. 3B is a detail view showing a modified disk arrangement according to another embodiment of this invention.

Referring now to FIG. 4B, it will be seen that the adjusting means 118 of each of the cylinders 28, 29 is substantially identical with that in FIGS. 1–3 and is provided with an abutment 116 by means of which the brake play can be established. The saw-tooth screw 119 again engages the split nut 121 which, in turn, forms a lost-motion linkage with the bottom 107a of the piston 107 and its split ring 123. The piston 107 carries the piston rod 28', 29' as previously indicated.

During normal brake operation, the tandem master cylinders supply hydraulic fluid simultaneously to the cylinders 28 and 29 and effect a concurrent outward displacement of the brake shoes 27 and 26 into engagement with the brake drum 24. Under these conditions, levers 37 and 38 both operate against the ring 32 which remains substantially fixed because of the balanced force acting thereon. When one of the fluid supplies for the cylinders 28 or 29 fails, the remaining cylinder applies force to its piston and brake shoe to shift it against the brake drum while its cylinder 28 or 29 acts to swing its lever 37 or 38 in the clockwise sense by means of the reaction force. The operative cylinder draws the ring 32 toward itself and swings the lever of the non-actuated cylinder to bring its brake shoe into engagement with the drum. To the extent that the stroke of the operative piston is increased by taking up the play of both brake shoes, the corresponding adjusting means 118 resets the play, whereupon the rings 32 are somewhat offset from their original position just as the disk 101 and the yoke 2 were repositioned upon a failure of one of the fluid-responsive systems.

Figure 5:
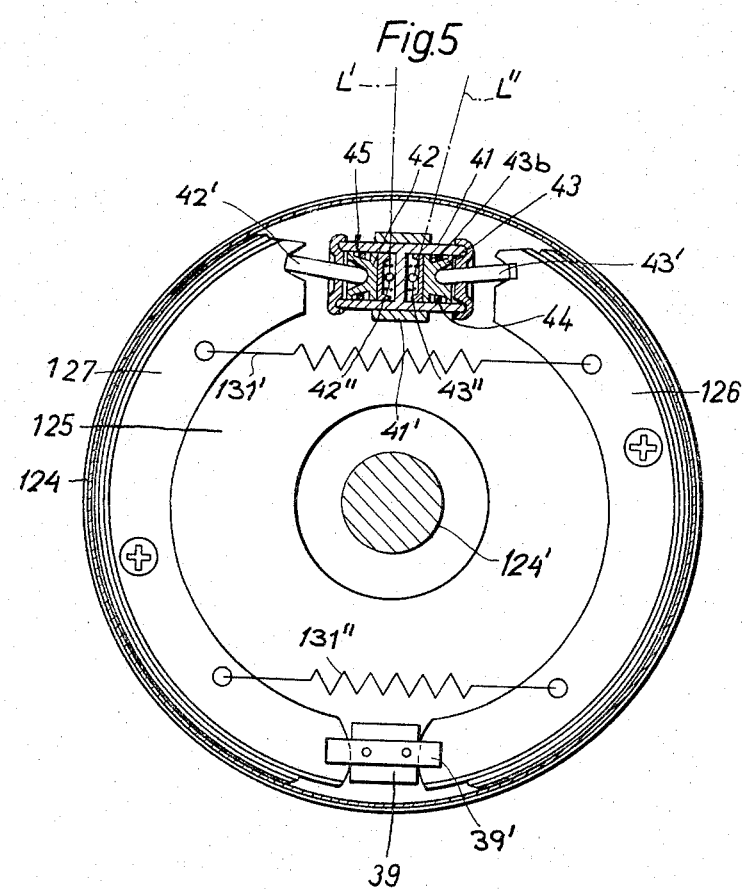
FIG. 5 is a view similar to FIG. 4 of another brake device.
Figure 5A:
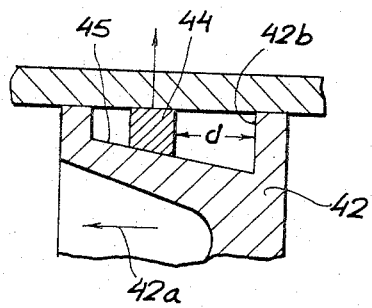
FIG. 5A is a detail view of the adjusting means of FIG. 5, drawn to an enlarged scale.

In FIGS. 5 and 5A, I show a modified internal-expanding drum-type brake, wherein the support member for the brake shoes, which is displaceable relatively to the drum includes the cylinder of the fluid-responsive means. In this arrangement, the brake shoes 126 and 127 have a common abutment 39 whose strap 39′ holds the rounded extremities of the brake shoes 126 and 127 in place against this abutment which is affixed to the shield 125 which is mounted upon the axial housing in the usual manner. The drum 124 of the brake is carried by the axle 124′ while a pair of springs 131′, 131″ tend to draw the brake shoes inwardly away from the drum. The twin wheel-brake cylinder 41 is slidably mounted (e.g. via a guide 41′) upon the support shield 125 and forms a pair of cylinder bores each of which receives a respective piston 42, 43, bearing with a respective bar 42′, 43′ against the corresponding brake shoes 127, 126. Apertures 41″ and 43″ communicate with fluid-supply lines L′ and L″ which, in turn, are supplied with hydraulic fluid from the tandem cylinders of a master cylinder of the type illustrated in FIG. 3. The automatic adjusting means of this modification includes outwardly biased spring rings 44 respectively surrounding the pistons 42, 43 and co-operating with the tapering surfaces 45 thereof as illustrated in FIG. 5. When each of the pistons 42, 43 is displaced axially (e.g. in the direction of arrow 42a, in FIG. 5) to shift the respective brake shoe against the drum 124, the spring rings 44, which have conical internal surfaces to form annular wedges, do not impede the piston movements. When brake wear occurs, the shoulder 42b or 43b of each piston, is displaced somewhat further in this direction and may then engage the respective ring 44 to shift it in the same direction. When, however, fluid pressure is discontinued, the piston 42 or 43 moves inwardly until its surface 45 engages the spring ring 44 and is precluded from further movement by virtue of the wedging action of the spring ring, and piston. The original play is thus restored and is a function of the original distance d between the shoulder 42b or 43b and the respective ring 44. Similarly, the failure of the fluid-supply line to one of the piston bores, e.g. that receiving piston 43, will result in displacement of the piston 42 in the direction of arrow 42a, until its brake shoe 127 engages the drum 124. Thereafter the reaction force applied to the common cylinder 41 will move it to the right (FIG. 5) and thereby entrain the piston 43 via its spring ring to shift the brake shoe 126 against the drum. The increased stroke of the piston 42 is automatically compensated by a movement of the spring ring 44 associated therewith through a distance sufficient to restore the original piston stroke and enable subsequent operation even with the piston 43 unactuated, to proceed with the same stroke of the actuated piston. When the fluid line to the bore of piston 42 fails, the cylinder 41 shifts to the left and a similar engagement of both brake shoes is effected.

The guide 41′ engages the cylinder 41 resiliently to provide a resistance to displacement of the cylinder, this resistance tending to maintain its new position after the initial actuation of the brake when one of the pistons is itself inoperative.

Figure 6:
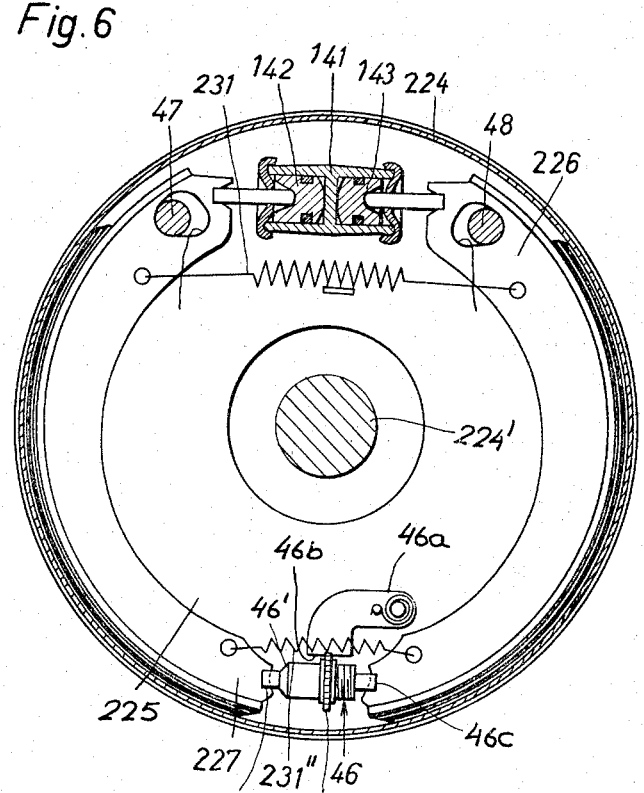
FIG. 6 is another view similar to FIG. 4 of an internal-expanding brake embodying the invention.
Figure 7:
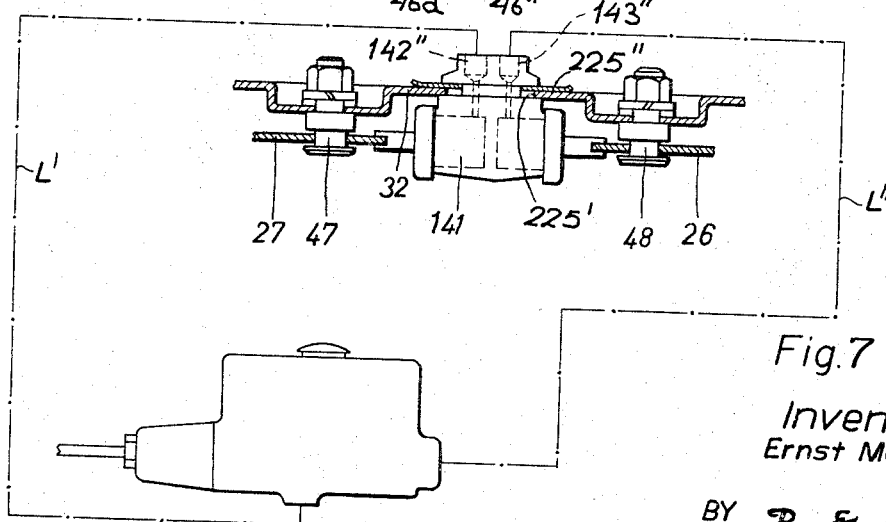
FIG. 7 is a plan view of the brake yoke thereof showing the support structure therefor.

In FIGS. 6 and 7, I show a so-called dual-servo brake in which the cylinder 141 is again subdivided into two chambers or bores receiving the pistons 142 and 143, respectively. The ports 142″ and 143″ serve to supply hydraulic fluid to the piston chambers via the lines L′ and L″ from a tandem master cylinder of the type illustrated in FIG. 3. The cylinder housing 141 is axially guided in a slot 225′ of the support shield 225 mounted upon the axle housing against the frictional force of a leaf spring 225″. The drum 224 is carried by the shaft or axle 224′ as previously described while the brake shoes 226 and 227 (operated by the pistons 143 and 142, respectively) are drawn inwardly by the tension springs 231′ and 231″ while an automatic adjusting means for taking up the play can be provided as described hereinafter. It is also possible to make use of a manually adjustable compensating device 46′ having a ratchet wheel 46″ normally held against movement by a spring-loaded pawl 46a mounted upon the support shield 225. The pawl 46a engages the ratchet with a longitudinally extending edge 46b which insures contact in all positions of the adjusting device 46. The nut 46′ threadedly engages a spindle 46c and is freely rotatable upon its stem 46d so that rotation of the nut 46′ tends to spread the extremities of the brake shoes and compensate for brake wear or adjusts the play when one of the pistons is inoperative. A pair of abutment pins 47 and 48 are received within enlarged apertures 47′, 48′ of the brake shoes 227 and 228 so that, during simultaneous operation of the pistons 142 and 143, the brake shoes are urged outwardly uniformly and do not engage the pins 47 and 48. When one of the pistons (e.g. piston 43) fails to operate as indicated earlier, the remaining piston 42 urges its brake shoe 227 against the drum while the adjusting device 46 transfers such movement to the other brake shoe 226 and urges it against the pins 48 and the drum. When the brake shoes are considerably worn the reaction force upon the cylinder 141 can cause the latter to shift and bring the brake shoe 226 to bear upon the drum by lifting it off the pin 48. Failure of the piston 142 results in a similar operation of the brake of the piston 143.

Figure 7A:
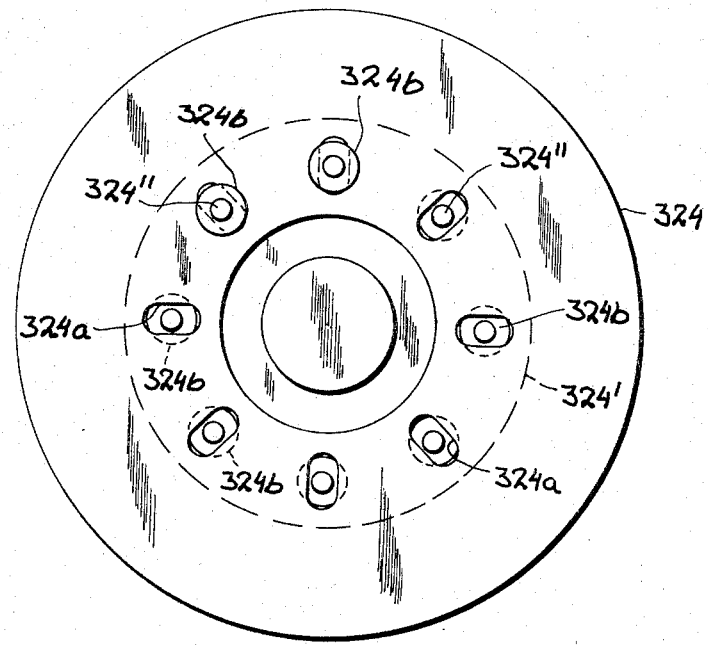
FIG. 7A is an end view of a modified supporting system for a drum of an internal-expanding brake.

In FIG. 7a, I show a system which can be identical to that of FIG. 6, except that the cylinder 141 need not be shiftable in the brake shield. In this case, the drum 324 can be mounted upon the usual axle flange 324″ by bolts 324″ which are received in radially extending slots 324a; these slots also clear the volts 324″ laterally so as to permit limited shifting of the drum radially with respect to its axis against the resistance of spring washers 324b of the Belleville type. It is also possible to mount the entire axle so as to be generally radially shiftable to a limited extent. Such radial movement is, of course, axial with respect to the fluid-pressure cylinders.

The invention as described and illustrated admits of various modifications within the ability of persons skilled in the art without departing from the spirit and scope of the invention as defined in the appended claims.

I claim:

1. In a brake including a rotatable member a nonrotatable structure comprising at least one nonrotatable friction element supported on each side of said rotatable member and movable relatively thereto into frictional engagement with a confronting surface of said rotatable member, a fluid pressure operated mechanism for effecting frictional engagement between said friction elements and their opposed confronting surfaces provided by said rotatable member, said mechanism including two pressure-responsive thrust devices one on each side of said rotatable member and associated one with each of said friction elements and each having a respective source of fluid pressure which is independently operable to apply the brake through its associated individual thrust device, said thrust devices having a mechanical interconnection therebetween by a yoke extending on opposite sides of said rotatable member, said yoke including a pair of cylinders, one on each side of said rotatable member, and being at least partially supported by a pivot member for swinging movement in a plane transverse to said rotatable member whereby reaction thrust is transmittable between said thrust devices to effect movement of said friction elements into engagement with the rotatable member, said thrust devices each having a variable length device for advancing its respective friction element towards its confronting disc surface whereby supply of fluid to only one thrust device is effective for communicating a reaction thrust to the thrust device non-operative by its associated source of fluid pressure and thereby effecting frictional engagement between both said friction elements and their respectively confronting surfaces of said rotatable member.

2. A disc brake in accordance with claim 1 including locking means for adjusting said friction elements relatively to their respectively coacting surfaces of said disc to reduce the brake-applying movement thereof.

3. A brake system in accordance with claim 1 including a support for said brake adapted for pivotally supporting said thrust devices, friction elements and associated actuating structure.

References Cited

UNITED STATES PATENTS

| | | | |
|---|---|---|---|
| 2,157,733 | 5/1939 | Sessions | 188—152 X |
| 2,404,326 | 7/1946 | Taylor | 188—196 |
| 2,533,186 | 12/1950 | Bricker et al. | 188—73 |
| 3,067,842 | 12/1962 | Smith | 60—54.5 |
| 3,140,759 | 7/1964 | Cagle | 188—73 |
| 3,150,745 | 9/1964 | Eksergian | 188—73 |
| 3,156,325 | 11/1964 | Taylor | 188—73 |

FOREIGN PATENTS

| | | |
|---|---|---|
| 1,146,888 | 5/1957 | France. |
| 631,880 | 11/1949 | Great Britain. |
| 806,919 | 1/1959 | Great Britain. |
| 951,906 | 3/1964 | Great Britain. |

MILTON BUCHLER, *Primary Examiner.*

G. E. A. HALVOSA, *Assistant Examiner.*